United States Patent [19]

Makino

[11] 3,838,949

[45] Oct. 1, 1974

[54] HELICAL GEAR PUMP

[75] Inventor: Kosei Makino, Nishinomiya, Japan

[73] Assignee: Sumimoto Shipbuilding & Machine Co., Ltd., Tokyo, Japan

[22] Filed: Mar. 15, 1973

[21] Appl. No.: 341,631

[52] U.S. Cl. .................................. 418/48, 418/153
[51] Int. Cl. .............................................. F04c 5/00
[58] Field of Search ....................... 418/48, 152, 153

[56] References Cited

UNITED STATES PATENTS

| | | | |
|---|---|---|---|
| 2,161,374 | 6/1939 | Moineau | 418/48 X |
| 2,874,643 | 2/1959 | Bourke | 418/48 |
| 3,084,631 | 4/1963 | Bourke | 418/48 |
| 3,280,753 | 10/1966 | Zimmer | 418/48 |

FOREIGN PATENTS OR APPLICATIONS

| | | | |
|---|---|---|---|
| 842,484 | 7/1960 | Great Britain | 418/84 X |

*Primary Examiner*—C. J. Husar
*Assistant Examiner*—Leonard Smith
*Attorney, Agent, or Firm*—Sughrue, Rothwell, Mion, Zinn and Macpeak

[57] ABSTRACT

A helical gear pump provided with a cylindrical rigid casing and a resilient flexible stator member encased in said cylindrical rigid casing and having internal helical grooves of which each end of said stator member is turned up and outwardly and is engaged in a radially extending rim in which each end of said cylindrical rigid casing is tucked therein, simultaneously the outer periphery of said rim is tapered toward the end of said stator member. Thus, both ends of said cylindrical rigid casing are prevented from corrosion and materials transported through said pump may be prevented from leaking outwards of said pump.

2 Claims, 1 Drawing Figure

20
81 21 19 2
4
5 6 7 8 14
13 12 3
11 11'
15
22
17 16 1
10 9 18
33 25 23 24 32 31 30

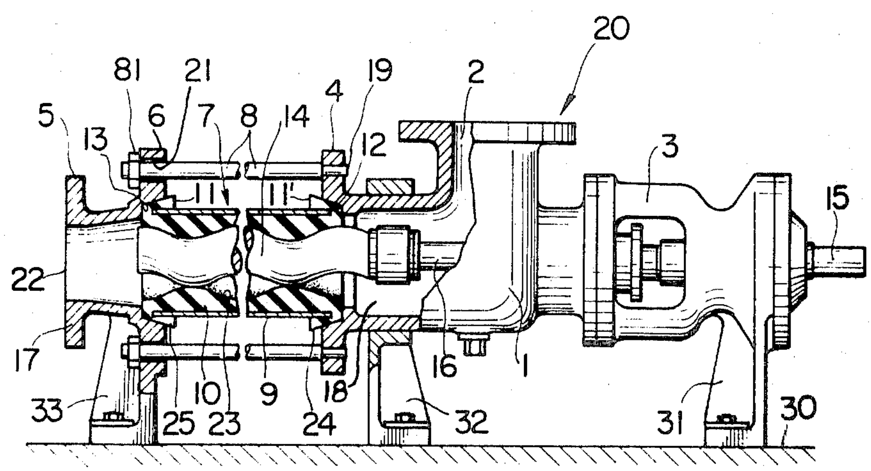
20
81
21
19
2
4
5
6
7
8
14
3
13
12
11
11'
15
22
17
16
1
33
25
10
23
9
24
18
32
31
30

HELICAL GEAR PUMP

BACKGROUND OF THE INVENTION

1. Field of the Invention

This invention relates to an improved helical gear pump of the progressing cavity type wherein a helically externally threaded rotor coacts with an stator assembly provided with a external, cylindrical rigid casing and an internally helically threaded stator member of flexible or resilient material such as rubber or the like which is encased in the cylindrical rigid casing.

2. Description of the Prior Art

A pump of the progressing cavity type has for many years been well known under the trandemark Moyno which is disclosed in, for example, U.S. Pat. No. 3,280,753 and has been broadly used in various industrial fields since a pump of this type has advantages that uniform transportation of material can be obtained without necessity of pulsation and steering of the materials and the transporting materials may be effected that are not only solid, but also liquid as well as being corrosive materials.

Generally speaking, in a know helical gear pump provided with a stator assembly which is constituted with an external, cylindrical casing made of rigid material and an internally helically threaded stator member made of flexible or resilient material such as rubber or the like which is encased in the cylindrical rigid casing and which forms a helical progressing cavity in cooperation with a helically externally threaded rotor, the stator member is merely attached to the cylindrical rigid casing with an adhesive and each end of the cylindrical rigid casing protrudes from the stator member. Therefore, in case that the pump transports a corrosive material, it is necessary to fabricate the cylindrical rigid casing with corrosion resistive material such as stainless steel of the like. Nevertheless the adhesive to attach the stator member to the cylindrical rigid casing and other adjacent members constituting the pump is eroded by the transporting corrosive material. As a result of this, the transporting material is apt to leak from the pump. Further, the stator assembly of the known helical gear pump must be fixed with the adjacent members at its both ends by performing suitable mechanical working for maintaining fluid tight conditions therebetween, so that reduction of its strength has occurred.

SUMMARY OF THE INVENTION

It is an object of the invention to provide a stator assembly for use in a helical gear pump in which an inner resilient material encircles opposite end portions of an outer rigid casing to protect it from corrosion by means of corrosive fluid to be handled.

It is further object of the invention to provide a stator assembly which maintains a fluid tight condition between respective other pump constructing members adjacent the stator and both ends of the assembly without any packing members.

It is still further object of the invention to provide a stator assembly which has no particular securing means, for example threads, bores or others, at the opposite ends thereof for preventing reduction of strength of the stator.

BRIEF DESCRIPTION OF DRAWING

An accompanying single FIGURE represents an embodiment of the invention.

DESCRIPTION OF PREFERRED EMBODIMENT

In the accompaning drawing a helical gear pump, generally indicated by numeral 20, is provided with a bearing casing 3, an intake member 1, an exhaust fitting 17, a stator assembly 7 secured between the intake member 1 and the exhaust fitting 17, and rotor 14 rotatably mounted in the progressive cavity of the stator member.

The inner cavity of the intake member 1 and that of the bearing casing 3 are connected with each other and a driving shaft 15 driven by any suitable power source, not shown, and a connecting rotating shaft 16 are mounted so as to extend through the cavities. Further descriptions about the above construction will be omitted since it is similar to a well known pump.

The intake member 1 has a fluid supply opening 2 at its top portion and a horizontally directed opening 18 at which one end portion of the rotor 14 is fixed with one end of the connecting rod 16. The pheriphery of the opening 18 is formed by an annular flange 4, further having a plurality of screw threaded bores 19 at equal angular spaces to each other.

The bearing casing 3, the intake member 1 and the exhaust fitting 17 which has an exhaust opening 22 are mounted on legs 31, 32 and 33, respectively, as shown in the FIGURE. At least one of the legs 31, 32 and 33 is adjustably fixed to the base 30. Flanges 5 and 6 are formed on respective ends of the fitting 17 and the intake member 1 adjacent the stator assembly 7. The flange 6 has a plurality of bores 21 which are equally angularly spaced to each other and each bore 21 is axially in alignment with said respective threaded bore 19.

The stator assembly 7 is provided with a stator member 10 made of rubber or other suitable flexible and resilient material which has a helical bore 23 and a cylindrical casing 9 made of rigid material such as rigid metal. The helically shaped rotor 14 is rotatably inserted in said helical bore 23. The one end of the rotor 14 is fixed with one end of the connecting rod 16, so that the rotor 14 rotates in the bore 23 of the flexible member 10 to feed material to be fed is a manner similar to a known helical gear pump.

Both ends of the flexible member 10 according to the invention are tucked up outwardly to form radially extending rims 11, 11' respectively. The outer periphery of each rim tapers toward the longitudinal end of the stator assembly 7 as indicated by numerals 24, 25. The flanges 4, 6 have outwardly divergent conical inner surfaces 12 and 13 which taper toward the longitudinal inside thereof so as to fit sufficiently on the tapered outer peripheries of the rims 11, 11', respectively.

Both ends of the cylindrical rigid casing 9 are respectively embedded in the rims 11, 11', so that the ends do not protrude in the atmosphere as clearly shown in the FIGURE. In assemblying, the respective tapered outer peripheries 24, 25 of the rims 11, 11' are fitted compressively with conical inner surfaces 12, 13, then a plurality of clamping rods 8 are bolted to the threaded bores 19 of the flange 4 through loosened bores 21 of the flange 6 and finally the rods 8 are secured at the positions by dint of nuts 81 respectively. In use, the close engagement between the outer peripheries 24, 25 and the inner surfaces 12, 13 of flanges 4, 6 establish excellent fluid tight conditions, respectively, and further the ends of the cylindrical rigid casing 9 are covered with the rims 11, 11', so that, if leakage occurs, the cylindrical rigid casing 9 can be prevented from undesirable corrosion. Furthermore, the stator 7 can be mounted without any mechanical working for the cylindrical rigid casing 9 and any packing means.

While a particular embodiment of the invention has been described, it is obvious to those skilled in the art that various changes and modifications may be made without departing from the invention in its broder aspects, therefore only such limitations should be imposed as are indicated by the spirit and scope of the appended claims.

What is claimed is:

1. In a helical gear pump including axially spaced, hollow intake and exhaust members supporting therebetween a stator assembly consisting of an outer cylinderical rigid casing and an inner concentrically supported resilient flexible stator, the improvement wherein:

said flexible stator is axially elongated relative to said rigid casing and is provided with integral, radially outward extending rims at both ends within which the ends of said rigid casing are embedded, said intake and exhaust members are each provided with an integral flange at their ends adjacent the stator assembly, with said flanges forming internal, radial surfaces engaging respective rims, and a plurality of clamping rod and nut assemblies span the flanges of said intake and exhaust members to compress said rims between said casing and said members.

2. A helical gear pump as claimed in claim 1, wherein the inner periphery of said flanges taper radially outward in a direction toward each other and the peripheries of said rims are respectively oppositely tapered so that each flange inner periphery fits the tapered outer periphery of the associated rim.

* * * * *